(12) United States Patent
Loose

(10) Patent No.: US 11,653,750 B2
(45) Date of Patent: May 23, 2023

(54) GRAPHENE POLYMER COMPOSITES FOR HAIR STYLING TOOLS AND APPLIANCES

(71) Applicant: Joe Loose, Novi, MI (US)

(72) Inventor: Joe Loose, Novi, MI (US)

(73) Assignee: Joe Loose, Novi, MI (US)

( * ) Notice: Subject to any disclaimer, the term of this patent is extended or adjusted under 35 U.S.C. 154(b) by 441 days.

(21) Appl. No.: 16/640,125

(22) PCT Filed: Aug. 21, 2018

(86) PCT No.: PCT/US2018/047145
§ 371 (c)(1),
(2) Date: Feb. 19, 2020

(87) PCT Pub. No.: WO2019/040391
PCT Pub. Date: Feb. 28, 2019

(65) Prior Publication Data
US 2021/0186197 A1    Jun. 24, 2021

Related U.S. Application Data

(60) Provisional application No. 62/548,153, filed on Aug. 21, 2017.

(51) Int. Cl.
*A46B 15/00* (2006.01)
*C08K 3/04* (2006.01)
(Continued)

(52) U.S. Cl.
CPC .......... *A46B 15/0018* (2013.01); *A46B 9/023* (2013.01); *A46D 1/02* (2013.01);
(Continued)

(58) Field of Classification Search
CPC ..... C08K 3/042; C08L 59/02; A46B 15/0018; A46B 9/023; A46B 2200/104;
(Continued)

(56) References Cited

U.S. PATENT DOCUMENTS 2,665,443 A    1/1954  Simon
4,500,939 A    2/1985  Gueret
(Continued)

FOREIGN PATENT DOCUMENTS

GB    2265829 A  * 10/1993  ............. A45D 24/02
JP    3004649 U  * 11/1994  ............. A45D 24/00
(Continued)

OTHER PUBLICATIONS

English translation of KR 2016-0028049 A, Park et al., Mar. 2016. (Year: 2016).*
(Continued)

*Primary Examiner* — Laura C Guidotti
(74) *Attorney, Agent, or Firm* — Taft Stettinius & Hollister LLP

(57) ABSTRACT

A hairstyling assembly comprising the main components of a handle and a barrel and bristles having a graphene material composite for retaining energy and is electrically conducting static electricity from a head of hair through the bristles and barrel and handle to ground.

15 Claims, 4 Drawing Sheets

(51) Int. Cl.
  *A46B 9/02* (2006.01)
  *A46D 1/00* (2006.01)
  *A46B 5/02* (2006.01)
  *A46B 7/00* (2006.01)
  *C09D 1/00* (2006.01)
  *H01B 1/24* (2006.01)
(52) U.S. Cl.
  CPC ............... *C08K 3/042* (2017.05); *A46B 5/02* (2013.01); *A46B 7/00* (2013.01); *A46B 9/026* (2013.01); *A46B 2200/104* (2013.01); *C09D 1/00* (2013.01); *H01B 1/24* (2013.01)
(58) Field of Classification Search
  CPC ...... A46D 1/0207; A46D 1/0223; C09K 3/16; C09D 7/63; C09D 7/20
  USPC .................................................. 15/159.1–160
  See application file for complete search history.

(56) References Cited

U.S. PATENT DOCUMENTS

| | | | |
|---|---|---|---|
| 4,549,559 A | 10/1985 | Gueret et al. | |
| 4,610,925 A | 9/1986 | Bond | |
| 4,632,135 A | 12/1986 | Lenting et al. | |
| 4,797,966 A | 1/1989 | Fong | |
| 5,150,491 A | 9/1992 | Ikemoto | |
| 6,024,101 A | 2/2000 | Garner | |
| 6,382,216 B1 | 5/2002 | Clark | |
| 6,915,543 B2 * | 7/2005 | McEntyre | A46B 9/023 15/186 |
| 8,196,592 B2 * | 6/2012 | Choi | A45D 24/16 132/120 |
| 8,875,717 B2 | 11/2014 | Murzynski et al. | |
| 10,925,367 B2 * | 2/2021 | Loose | A45D 24/00 |
| 2004/0016066 A1 | 1/2004 | Frazier et al. | |
| 2009/0165234 A1 | 7/2009 | Bernat Bernat | |
| 2011/0017226 A1 | 1/2011 | Choi | |
| 2011/0240053 A1 * | 10/2011 | Murzynski | A45D 1/00 132/221 |
| 2015/0064571 A1 | 3/2015 | Wu et al. | |
| 2015/0128366 A1 | 5/2015 | Kim | |
| 2017/0037257 A1 | 2/2017 | Yang et al. | |
| 2021/0161270 A1 * | 6/2021 | Loose | A45D 20/10 |

FOREIGN PATENT DOCUMENTS

| | | | | |
|---|---|---|---|---|
| KR | 2016-0028049 A | * | 3/2016 | ............ A45D 24/04 |
| WO | 2014001879 A1 | | 1/2014 | |
| WO | 2018001196 A1 | | 1/2018 | |

OTHER PUBLICATIONS

English translation of JP 3004649 U, Nov. 1994. (Year: 1994).*
International Search Report and Written Opinion for corresponding PCT/US18/47145 dated Sep. 11, 2018.

* cited by examiner

GRAPHENE POLYMER COMPOSITES FOR HAIR STYLING TOOLS AND APPLIANCES

CROSS REFERENCE TO RELATED APPLICATION

This application claims the benefit of U.S. Provisional Application Ser. No. 62/548,153 filed Aug. 21, 2017.

BACKGROUND OF THE INVENTION

1. Field of the Invention

A thermally conductive hairstyling assembly being thermally conductive for conducting static electricity from the hair to ground.

2. Description of the Prior Art

Personal grooming of hair is frequently accomplished using a hair dryer and brush or comb. This can result in damaged hair due to the brush or comb comprising synthetic materials, such as a nylon or plastic. These types of dielectric materials do not adequately conduct and/or retain heat properly and lead to electrostatic charge build up causing hair to be more prone to frizz, fly-away, split ends, dullness, dry and itchy scalp. Also, the use of polymer composites in the beauty industry hair tools consists of traditional plastic and nylon polymers that have performed adequately but because of the high-heat and high-style trends, have shorter life expectancies. Combs and brush bristles bend, melt, and break under the high heat/high stress conditions.

Hair styling devices such as brushes and combs in general are known in the art. Wood combs have been well known for decades for their antistatic capabilities. Metal brushes and combs are known to have excellent anti-static qualities, as well as, for being more conductive with the heat of a blow dryer. Compounds and coatings have been developed to give brush bristles and brush barrels non-static properties, but brushes treated with them do nothing to dissipate the static electricity built up in the hair. Even though static charge has been better managed in the bristles and barrel of the brush, this does not help with the electrical charge build up that takes place over the rest of the body of the styling device. Static charge needs a place to be truly remediated. Creating connected pathways of positive ionic flow from the hair styling tool to the user is the only means of effective static charge remediation.

A hair styling tool having antistatic qualities is U.S. Pat. No. 4,632,135 issued Dec. 30, 1986 to Lenting et al. This patent describes a comb connected to a device having a high-voltage source arranged in a holder and a plurality of electrodes electrically connected to the source for generating ions and projecting into the air. These ions neutralize the positive charge of the hair caused by the friction between the hair and the movement of the comb over the hair.

Likewise, U.S. Patent Application Publication No. 2004/0016066 issued Jan. 29, 2004 introduces a static removing hairbrush that dissipates electrostatic charges from the hair and brush by providing a circuit away from the hair being brushed and away from the user. The brush has a plurality of conductive bristles connected to a ground wire that is attached to an electrical ground.

U.S. Pat. No. 4,797,966 issued Jan. 17, 1989 to Fong describes an antistatic hairbrush that eliminates the electrostatic charge in a user's hair by providing a discharge circuit from the brush handle to the user's hand.

U.S. Pat. No. 2,665,443 issued Jun. 4, 1949 to Simon et al., teaches bristles of a hairbrush made from dielectric materials combined with etymols to create antistatic properties within bristles.

Similarly, U.S. Pat. No. 4,610,925 issued Sep. 9, 1986 teaches bristles of a hairbrush having a nylon or polyester core and a compatible polymeric sheath containing carbon to create antistatic properties within the bristles.

WIPO Patent Application Publication No. WO2018001196 issued on Jun. 30, 2016 to Xu Jiacai introduces an antistatic hair brush where the main body of the brush is coated with an electrically conductive film and a resin film that lowers the static property of the brush handle.

U.S. Pat. No. 6,024,101 issued on Feb. 15, 200 to Garner discusses a hair styling brush having a brush head that is conductive and coated with a temperature sensitive color-changed material to indicate a minimum threshold temperature for hair styling.

Similarly, WIPO Patent Application Publication No. WO 2014001879 issued on Jun. 26, 2013 teaches a brush having a heat conductive coating allowing for continuous application of heat at lower temperatures.

SUMMARY OF THE INVENTION

The subject invention provides such an assembly for a hairstyling assembly with a material makeup including:
a coating disposed on the handle and containing graphene and an antistatic agent
a barrel containing graphene and an antistatic agent
a plurality of bristles containing graphene and an antistatic agent
and whereby graphene and the antistatic agent retains thermal energy and is electrically conductive for transferring static electricity from a head of hair through the bristles, barrel, and handle to ground the static electricity out of the handle.

Advantages of the Invention

The invention in its broadest aspect is a hairstyling assembly that thermally conducts heat from a source such as a blow dryer for hair styling and statically dissipates static electricity buildup on a person's hair and grounds the static electricity through the user by a combination of parts having a material makeup of a graphene polymer composite.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
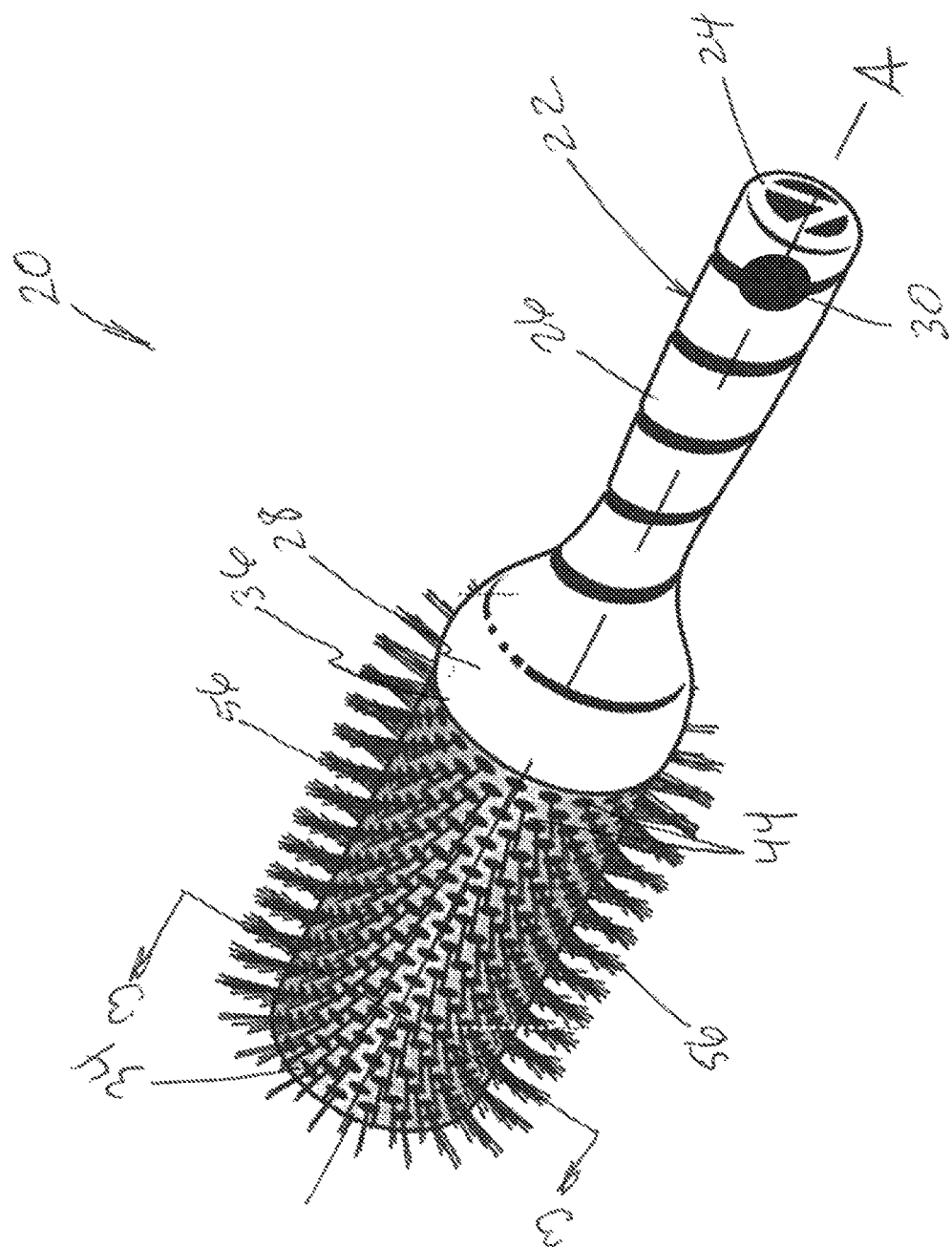
FIG. 1 is a perspective view of the hairstyling assembly.

Referring to the Figures, wherein like numerals indicate corresponding parts throughout the several views, a hairstyling assembly 20 of the type for styling hair is generally shown in FIG. 1. This styling device is known as a hairbrush. Other types of hairstyling assembly 20 may include, but are not limited to all types of brushes, hair dryers, diffuser attachments, flat irons, hair curlers, hair clips, hair pins, barrettes, headbands, haircutting combs, detangling combs and brushes, hot rollers, and velcro rollers.

Figure 2:
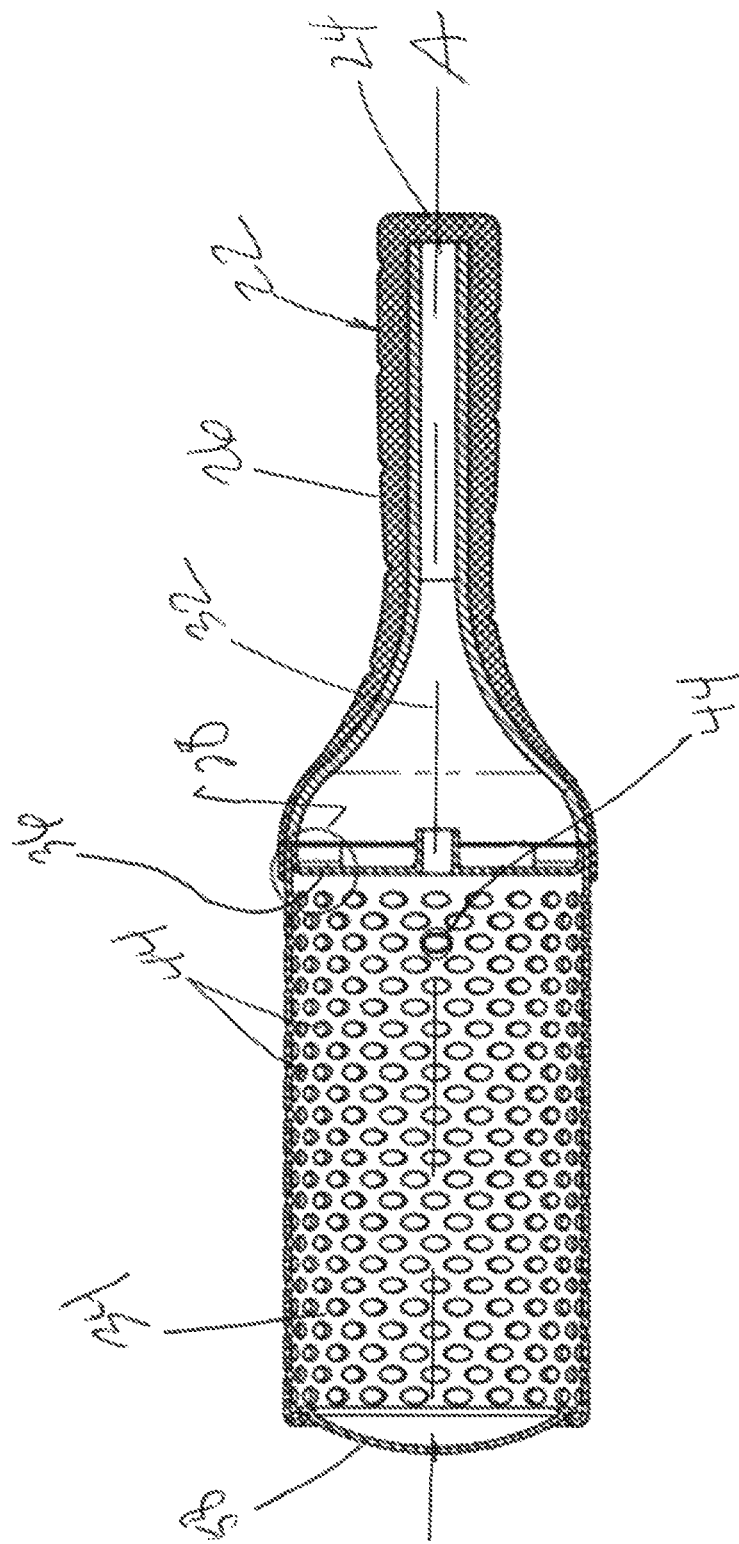
FIG. 2 is a section view of the hairstyling assembly.

The device, generally indicated in FIGS. 1 and 2, includes a handle 22 for holding while styling hair, having a cylindrical shape and extending along a center axis A. The handle 22 has a distal end 24 that extends through a grip section 26 and into a cup-shaped end 28 being radially larger than the grip section 26. The handle 22 presenting a hanger hole 30 extending transversely through the distal end 24 for storage or usage functions, e.g., storage by a hook or looping a cord through the hole 30 for fastening around a person's wrist. The handle 22 has a bore 32 extending along the center axis A from the cup-shaped end 28.

Figure 3:
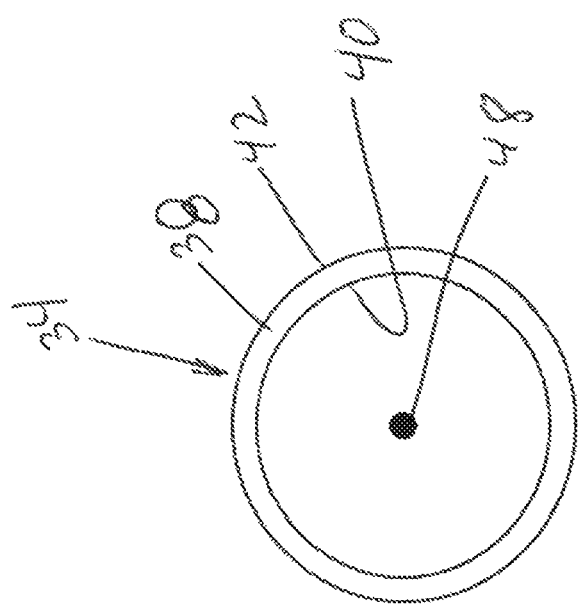
FIG. 3 is a section view of the barrel of the hairstyling assembly.

A barrel 34 of the styling device is retained in the cup-shaped end 28 of the handle 22 and axially aligned with the center axis A and extending to an open end 36. FIG. 3 shows the barrel 34 having a wall 38 that is defined by an interior 40 and an exterior 42 and surrounding the center axis A. The wall 38 of the barrel 34 having a plurality of apertures 44 forming a honeycomb pattern mutually in an offset relationship to one another. Alternatively, the apertures 44 can be arranged in other such patterns, for instance, where the ovals are lined in a block grid pattern or diagonal grid pattern, or instead elongated parallel apertures 44, that extend the length of the barrel 34. The preferred shape of the apertures 44 is an oval for optimal airflow, venting, and heat distribution, but can also be other shapes, such as for example, triangles, squares, hexagons, and other geometric type shapes.

Figure 4:
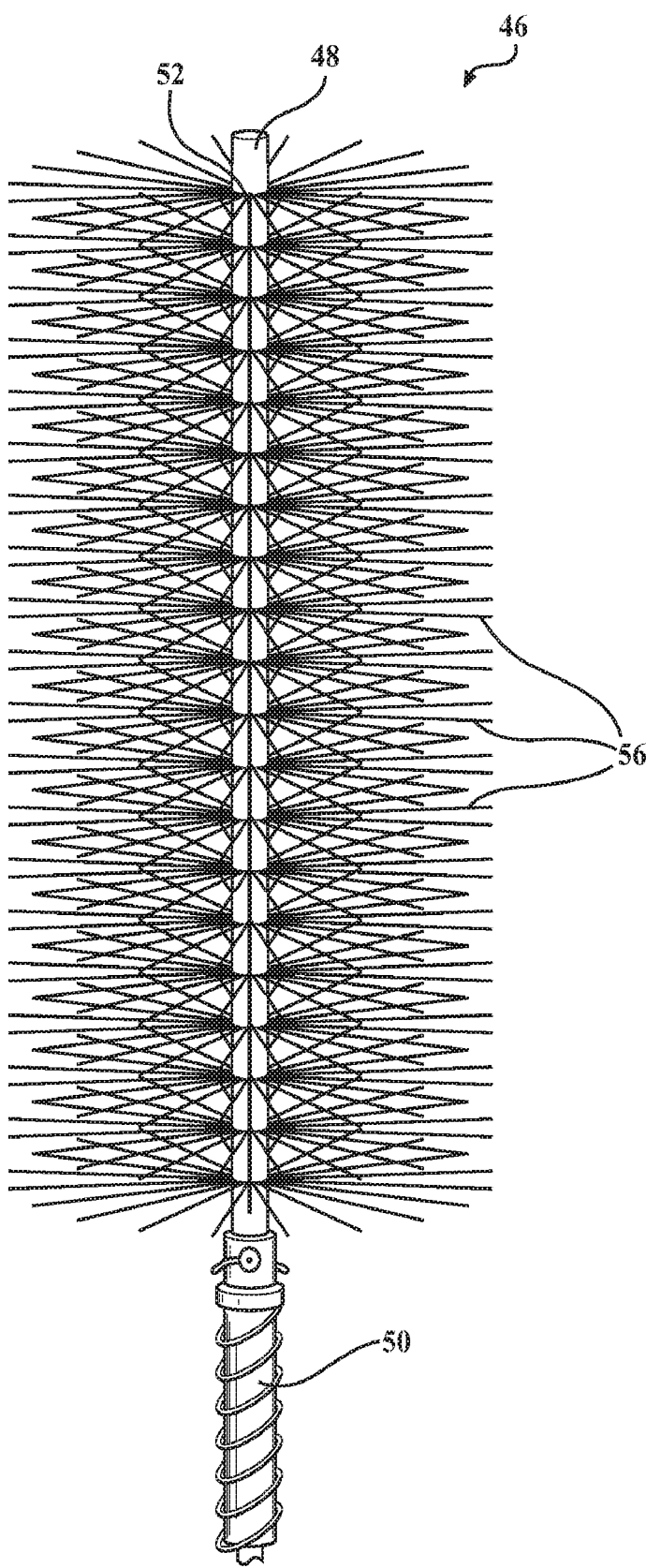
FIG. 4 is a side view of the bristle tree assembly.

A bristle tree assembly 46, shown in FIG. 4, including a rod 48 with a mounting section 50 and a bristle section 52. The mounting section 50 of the rod 48 retained in the bore 32 of the handle 22. A plurality of bristles 54 are anchored to the bristle section 52 of the rod 48 and extend radially from the bristle section 52 of the rod 48. The bristles 56 extend outwardly past the interior 40 of the barrel 34 and through the apertures 44 to the exterior 42 of the barrel 34. The diameter of the apertures 44 are dimensioned such that the total cross-section of the plurality of bristles 54 extending through a single aperture 44 only fills a fraction of the aperture 44 cross-section. A top cap 58 being cup-shaped and covering the open end 36 of the barrel 34 to close off the open end 36 of the barrel 34. The top cap 58 can also be provided with a bore 32 for receiving the bristle section 52 of the rod 48 so that the rod 48 is coaxially supported with respect to the handle 22.

The handle 22 a molded polymer, and is characterized by a coating 60 disposed on the handle 22. The coating 60 comprises, Propane and being a % volume of 25~30
VM&P Naphtha and being a % volume of 25~30
Heptane and being a % volume of 13~15
N-Butane and being a % volume of 5~10
Xylene and being a % volume of 5~10
Methyl Ethyl Ketone and being a % volume of 1~5
Methyl n-Amyl Ketone and being a % volume of 1~4
Ethylbenzene and being a % volume of 1~2
N006-010-P graphene powder and being a % volume of 7
Alkyl Sulphonate and being a % volume of 2~3
Benzenepropanamide,N,N'-1,6-hexanediylbis [3,5-bis(1,1-dimethylethyl)-4-hydroxy and being a % volume of 0.05~0.2.

The graphene polymer based thermal coating 60 can be applied to the substrate surface of any polymer. The coating 60 transforms the surface of the polymer into having a thermal conductivity of about 6-8 Watts per meter Kelvin (W/mK), a surface resistivity of $1 \times 10^4 \sim 10^6$, and increased mechanical and tribological strength. The paint base can also have different finishes such as a rubber finish, leather finish, suede finish, metallic finish, faux finish, plaster finish, texture sand finish, sandstone finish, flat finish, and satin finish. Other suitable paint bases including polyurethane paint, elastomer paints, and other rubberized and plastic paint coatings may be used.

The barrel 34 comprises:

Polyoxymethylene POM and being a % volume of 77~87
N006-010-P graphene powder and being a % volume of 9~19
N002-PDR nano graphene platelets and being a % volume of 0.5~1
Alkyl Sulphonate and being a % volume of 2~3
Benzenepropanamide,N,N'-1,6-hexanediylbis [3,5-bis(1,1-dimethylethyl)-4-hydroxy and being a % volume of 0.05~0.5.

The POM graphite polymer composite transforms the polymer into having a thermal conductivity of about 4-8 Watts per meter Kelvin (W/mK), and a surface resistivity of $1 \times 10^4$, as well as, increased qualities of higher tensile and mechanical strength and improved antibacterial properties. POM is the preferred polymer base for the graphene polymer composite, but can be substituted by nylon, polypropylene, ABS, and other like polymer based materials. Alkyl sulphonate is the preferred antistatic agent. Ionic antistats of cationic compounds, quaternary ammonium, phosphium, or sulfonium salts, and nonionic compounds, including sodium salts of sulfonates, phosphates, and carboxylic acids, can replace the alkyl sulphonate. Nonionic antistats including glycerol esters of fatty acids, and ethoxylated teriary amines, can also replace alkyl sulphonate. N002-PDR nano graphene platelets is preferred, but can be replaced with graphene oxide. Other additives can also be added into the current invention including, antioxidants, thermal stabilizers, antimicrobial agents, flame retardants, colorants, lubricants, clip agents, and radiation stabilizers.

The rod 48 comprises of any type of conductive material, such as, aluminum, iron, steel which is preferably rust-proof, or a composite plastic with conductive qualities.

The bristles 56 comprise:

a material chosen from the material group of Nylon wherein the material is Nylon 46 or Nylon 66 and being a % volume of 86~96
N006-010-P graphene powder and being a % volume of 1.5~10
N002-PDR nano graphene platelets and being a % volume of 0.5~1.0
Alkyl Sulphonate and being a % volume of 2~3
Benzenepropanamide,N,N-1,6-hexanediylbis [3,5-bis(1,1-dimethylethyl)-4-hydroxy and being a % volume of 0.05~0.5.

The graphene nylon polymer composite transforms the polymer into having increased thermal conductivity by transferring the heat energy form the initial point of contact down and throughout the entire bristle 56 of the styling device and therefore preventing structural failure in a localized area of the bristle 56. Static dissipation is reduced to a surface resistivity of $1 \times 10^6 \sim 10^9$, as well as, increased qualities of higher tensile and mechanical strength and improved antibacterial properties.

The percentage of graphene nano platelets dispersion varies upon the level of static dissipation desired contrasted with the level of mechanical stiffness desired for the bristle 56. Graphene Oxide (GO) can also be introduced into the formula as a partial substitute for graphene nanoplatelets to increase the flexibility of the bristles 56.

Alkyl sulphonate is the preferred antistatic agent for the bristle 56 formula. Ionic antistats of cationic compounds including quaternary ammonium, phosphonium, or sulfonium salts, and nonionic compounds, including sodium salts of sulfonates, phosphates, and carboxylic acids, can replace the alkyl sulphonate. Nonionic antistats including glycerol esters of fatty acids, and ethoxylated teriary amines, can also replace alkyl sulphonate.

Tourmaline powder can be used as an additive by emitting anions to help eliminate moisture form the hair. Other additives can also be added into the current invention including, antioxidants, thermal stabilizers, antimicrobial agents, flame retardants, colorants, lubricants, slip agents, and radiation stabilizers. The top cap 58 is molded in one piece from plastic/polymer material and coated with the coating 60.

The graphene and antistatic agent is for retaining energy and for electrically conducting static electricity from a person's hair the bristles 56 and barrel 34 and the handle 22 to ground.

The general characteristics, particle size distribution and physical sizes of the N002-PDR Nano Graphene Platelets are as follows in Tables 1-3 (Data retrieved from Angstron Materials Technical Data Sheet, revision date Apr. 1, 2014).

TABLE 1

General Characteristics of the N002-PDR Nano Graphene Platelets

| PARAMETER | SPECIFICATIONS |
|---|---|
| Visual | Fluffy, Light Powder |
| Color | Match Standard, Black |
| Moisture | ≤0.5% |
| Solids | ≥97.90% |
| True Density | ≤2.20 g/cm$^3$ |
| Specific Surface Area | 400 m$^2$/g-800 m$^2$/g |
| Carbon by wt % | ≥95.00% |
| Hydrogen by wt % | ≤2.00% |
| Nitrogen by wt % | ≤0.50% |
| Oxygen by wt % | ≤2.50% |
| Ash by wt % | ≤2.50% |

TABLE 2

Particle Size Distribution of the N002-PDR Nano Graphene Platelets

| PARAMETER | SPECIFICATIONS |
|---|---|
| MT10 | 3.30 um-3.90 um |
| MT50 | 8.00 um-10.00 um |
| MT90 | 17.00 um-20.00 um |

TABLE 3

Physical Sizes of the N002-PDR Nano Graphene Platelets

| PARAMETER | SPECIFICATIONS |
|---|---|
| Average Lateral Dimension (x & y) | ≤10.00 um |
| Average Through-Plane Dimension (z) | ~1.0-1.2 nm (as estimated by BET and particle size distribution data) |

The general characteristics, particle size distribution and physical sizes of the N006-010-P Nano Graphene Platelets are as follows in Tables 4-6 (Data retrieved from Angstron Materials Technical Data Sheet, revision date Aug. 14, 2012).

TABLE 4

General Characteristics of the N006-010-P Nano Graphene Platelets are Fine Greyish-Black Carbon in Powder Form

| PARAMETER | SPECIFICATIONS |
|---|---|
| Visual | Homogeneous; No Aggregation |
| Color | Match Standard Greyish-Black |
| Moisture | ≤1.20% |
| Solids | ≤98.80% |
| True Density | ≤2.20 g/cm$^3$ |
| Specific Surface Area | 21 m$^2$/g |
| Carbon by wt % | ≤97.00% |
| Hydrogen by wt % | ≤0.70% |
| Nitrogen by wt % | ≤0.50% |
| Oxygen by wt % | ≤1.50% |
| Ash by wt % | ≤1.50% |

TABLE 5

General Characteristics of the N006-010-P Nano Graphene Platelets are Fine Greyish-Black Carbon in Powder Form

| PARAMETER | SPECIFICATIONS |
|---|---|
| MT10 | 4.00 um-8.00 um |
| MT50 | 10.00 um-14.00 um |
| MT90 | 23.00 um-27.00 um |

TABLE 6

General Characteristics of the N006-010-P Nano Graphene Platelets are Fine Greyish-Black Carbon in Powder Form

| PARAMETER | SPECIFICATIONS |
|---|---|
| Average Lateral Dimension (x & y) | ≤14.00 um |
| Average Through-Plane Dimension (z) | ~10.0-20.0 nm (as estimated by a Dye Absorbing Method and particle size distribution data) |

Please note that the composites described in the present invention include, but are not limited to, compounded polymers such as PP, POM, LDPE, HDPE, LLDPE, ABS, PA6, PA46, PLA, Nylons, UHMWPE, and TPEs.

Obviously, many modifications and variations of the present invention are possible in light of the above teachings and may be practiced otherwise than as specifically described while within the scope of the appended claims.

What is claimed is:

1. A hairstyling apparatus, comprising:
   a handle configured to be gripped by a hand of a user;
   a barrel mounted to said handle; and
   a plurality of bristles extending from said barrel, said bristles configured to engage hair of the user;
   wherein said handle, said barrel, and said bristles comprise graphene;
   wherein said graphene provides an electrically-conductive pathway between said plurality of bristles, said barrel, and said handle such that static electricity generated by engagement of said bristles with the hair is dissipated to the hand via said hairstyling apparatus;
   wherein said handle comprises a coating including said graphene; and
   wherein said coating has a thermal conductivity is in the range of six to eight Watts per meter-Kelvin.

2. The hairstyling apparatus of claim 1, wherein said handle further comprises a polymer substrate covered by said coating.

3. The hairstyling apparatus of claim 1, wherein said barrel is formed of a composite, said composite comprising a polymer and said graphene.

4. The hairstyling apparatus of claim 3, wherein said polymer comprises polyoxymethylene.

5. The hairstyling apparatus of claim 3, wherein said composite has a thermal conductivity of four to eight Watts per meter-Kelvin.

6. The hairstyling apparatus of claim 1, wherein said bristles are formed of a composite, said composite comprising a nylon and said graphene.

7. The hairstyling apparatus of claim 6, wherein said nylon comprises Nylon 46 and/or Nylon 66.

8. A hairstyling apparatus, comprising:
   a handle comprising first graphene particles;
   a barrel mounted to said handle and comprising second graphene particles;
   a plurality of bristles extending from said barrel, said bristles comprising third graphene particles; and
   an electrically-conductive pathway extending between said handle and said bristles, said electrically-conductive pathway comprising said first graphene particles, said second graphene particles, and said third graphene particles;
   wherein said barrel is formed of a composite, said composite comprising a polymer and said second graphene particles; and
   wherein said composite has a thermal conductivity is in the range of four to eight Watts per meter-Kelvin.

9. The hairstyling apparatus of claim 8, wherein said handle further comprises a substrate and a coating covering at least a portion of said substrate; and
   wherein said coating comprises said first graphene particles.

10. The hairstyling apparatus of claim 9, wherein said substrate comprises a polymer.

11. The hairstyling apparatus of claim 8, wherein said second graphene particles comprise graphene powder and graphene nanoplatelets.

12. The hairstyling apparatus of claim 8, wherein said third graphene particles comprise graphene powder and graphene nanoplatelets.

13. The hairstyling apparatus of claim 8, wherein said bristles further comprise a nylon material.

14. The hairstyling apparatus of claim 8, wherein, with said handle held by a hand of a user and said bristles engaged with hair of the user, said electrically-conductive pathway dissipates static electricity from the hair to the hand.

15. A hairstyling apparatus, comprising:
   a handle configured to be gripped by a hand of a user;
   a barrel mounted to said handle; and
   a plurality of bristles extending from said barrel, said bristles configured to engage hair of the user;
   wherein said handle, said barrel, and said bristles comprise graphene;
   wherein said graphene provides an electrically-conductive pathway between said plurality of bristles, said barrel, and said handle such that static electricity generated by engagement of said bristles with the hair is dissipated to the hand via said hairstyling apparatus;
   wherein said barrel is formed of a composite, said composite comprising a polymer and said graphene; and
   wherein said composite has a thermal conductivity is in the range of four to eight Watts per meter-Kelvin.

* * * * *